(12) United States Patent
Fujiwara et al.

(10) Patent No.: US 6,865,329 B2
(45) Date of Patent: Mar. 8, 2005

(54) OPTICAL CONNECTOR CLEANING INSTRUMENT AND OPTICAL CONNECTOR CLEANING METHOD

(75) Inventors: Kunihiko Fujiwara, Sakura (JP); Takaaki Ishikawa, Sakura (JP); Kazuhiro Takizawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/152,322

(22) Filed: May 20, 2002

(65) Prior Publication Data

US 2003/0169992 A1 Sep. 11, 2003

(30) Foreign Application Priority Data

Mar. 7, 2002 (JP) .................................. P2002-062188
Apr. 19, 2002 (JP) .................................. P2002-118096

(51) Int. Cl.[7] .............................................. G02B 6/00
(52) U.S. Cl. .......................... 385/134; 385/147; 15/106
(58) Field of Search ................................ 385/134, 147; 15/106, 144.1, 144.3, 159.1, 169, 179, DIG. 4

(56) References Cited

U.S. PATENT DOCUMENTS

| | | | | | |
|---|---|---|---|---|---|
| 5,518,794 A | * | 5/1996 | Barber et al. | .................. | 428/95 |
| 6,110,013 A | * | 8/2000 | Minami et al. | ................ | 451/41 |
| 6,269,515 B1 | * | 8/2001 | Varma | .......................... | 15/160 |

FOREIGN PATENT DOCUMENTS

| | | | |
|---|---|---|---|
| JP | 62-203746 | * | 9/1987 |
| JP | 10-29158 | * | 2/1998 |
| JP | 2003-71390 | * | 3/2003 |

* cited by examiner

Primary Examiner—Tulsidas C. Patel
(74) Attorney, Agent, or Firm—Darby & Darby

(57) ABSTRACT

The present invention provides an optical connector cleaning instrument that enables cleaning of the front end of an optical connector with efficiency and certainty, and prevents excessive cleaning. The present invention further provides an optical connector cleaning method employing the aforementioned optical connector cleaning instrument. The optical connector cleaning instrument is provided with cleaning member for coming into contact with and cleaning the front end of the optical connector; a driver for driving the cleaning action of the cleaning member; and a switch for initiating the driving action of the driver.

13 Claims, 13 Drawing Sheets

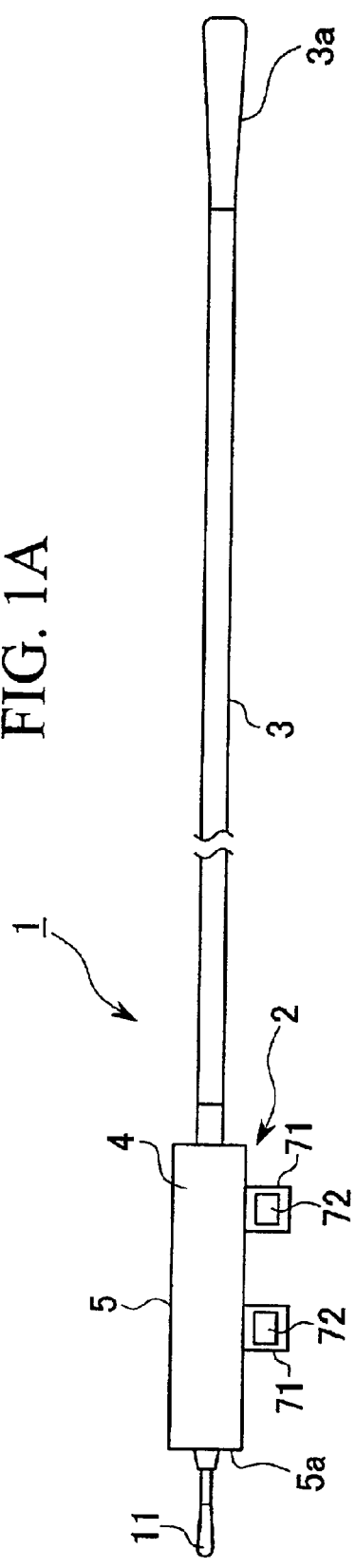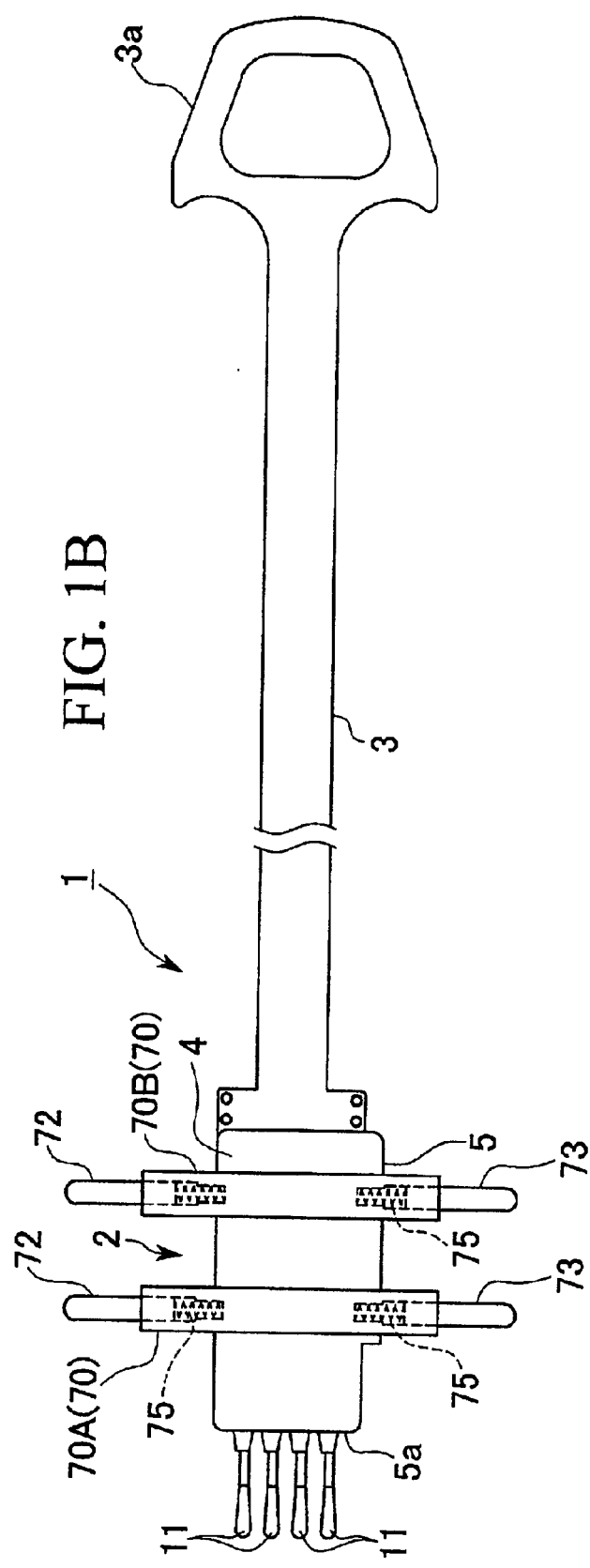

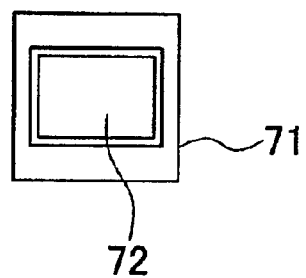
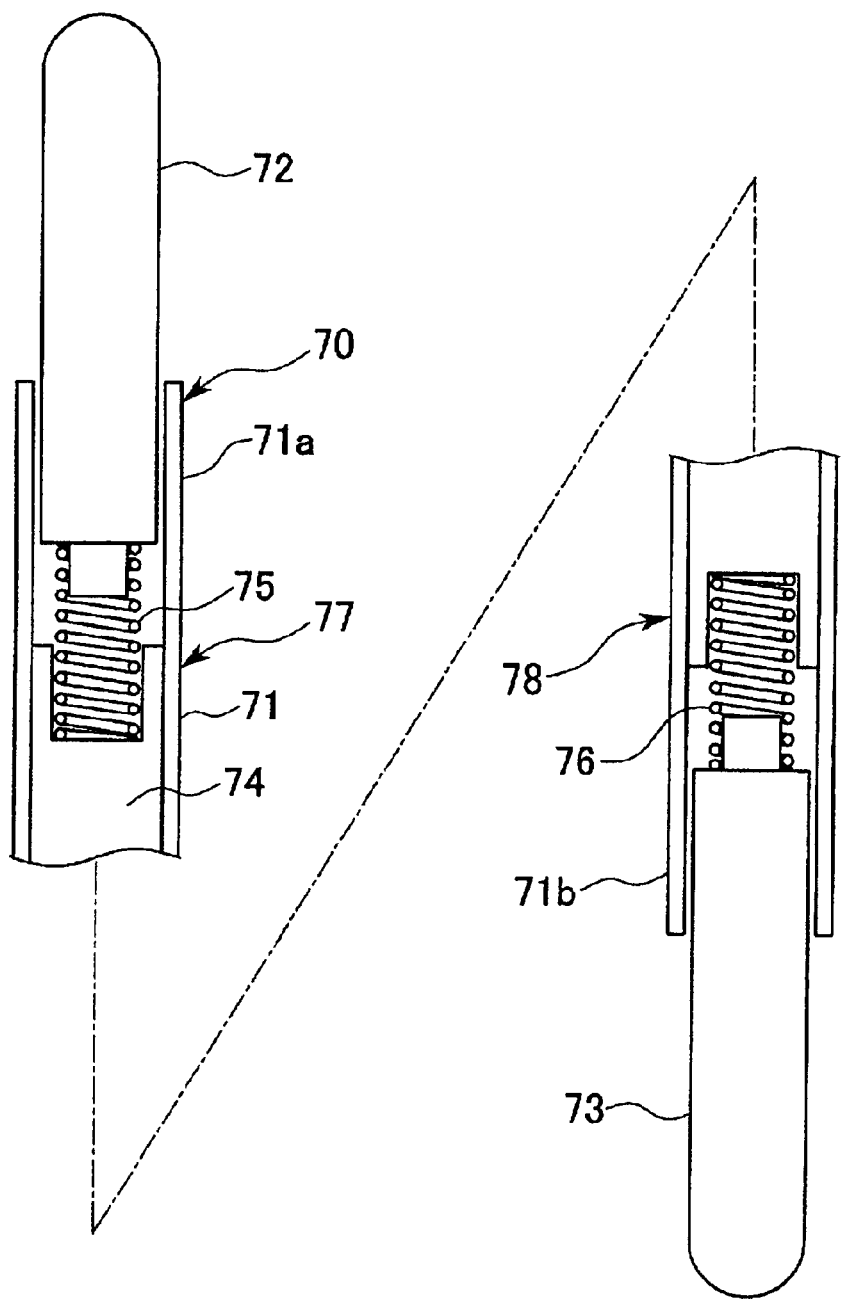

OPTICAL CONNECTOR CLEANING INSTRUMENT AND OPTICAL CONNECTOR CLEANING METHOD

BACKGROUND OF THE INVENTION

1. Field of the Invention

The present invention relates to an optical connector cleaning instrument employed to clean the ends of an optical connector, and to an optical connector cleaning method employing this optical connector cleaning instrument.

2. Description of the Related Art

When dusts or the like adheres to the connector end faces used as butt joints in the optical connectors, these materials may cause damage to the connectors during attachment and release, and can contribute to increased loss. These connector end faces must therefore be cleaned. The conventional method for cleaning connector end faces (also referred to as "connector end face cleaning method" hereinafter) typically use an alcohol-soaked cotton swab or tape-type cleaner that has been gripped by an operator's hand, to wipe this dusts away.

However, this type of optical connector end face cleaning method was problematic in that it was difficult to clean an optical connector positioned in a hard-to-reach location, such as an optical connector disposed deep inside a case of a plug-in unit for a back plane connector.

While a cleaning instrument with a long handle could be used to clean the optical connector in this case, it was difficult to visualize the site to be cleaned. Thus, it was difficult to confirm whether or not the cleaning instrument was actually in contact with the optical connector end face, and to evaluate how the cleaning procedure was progressing. Accordingly, there is a concern when conventional methods such as these are employed that an excellent cleaning may not be accomplished.

SUMMARY OF THE INVENTION

The present invention was conceived in view of the above-described circumstances, and has as its objective the provision of an optical connector cleaning instrument in which the end of the optical connector can be cleaned efficiently and very well.

To resolve the above-described problems, an optical connector cleaning instrument of the present invention is provided with a cleaning member that come in contact with and clean the end of the optical connector; a driver for driving the cleaning action of the cleaning member; and a switch for initiating the driving operation of the driver.

By using the switch to initiate the cleaning action of the cleaning member in this optical connector cleaning instrument, the optical connector end can be cleaned efficiently and with certainty.

Furthermore, to resolve the above-described problem, an optical connector cleaning method of the present invention is a method for cleaning the optical connector end using an optical connector cleaning instrument, wherein the optical connector cleaning instrument employed is equipped with a cleaning member that come in contact with and clean the end of the optical connector, a driver that drives the cleaning action of the cleaning member, and a switch that initiates the driving operation of the driver; and the switch is turned ON once the end of the cleaning members have come into contact with the end of the optical connector.

By employing the cleaning instrument described above in the present invention's cleaning method, the end of the optical connector can be cleaned efficiently and with certainty.

BRIEF DESCRIPTION OF THE DRAWINGS

FIG. 1A is a planar view of the outer appearance of one embodiment of the present invention's optical connector cleaning instrument.

FIG. 1B is a front view of the outer appearance of one embodiment of the present invention's optical connector cleaning instrument.

FIG. 3A is a planar view showing the vertical position holding mechanism (planar view showing the top push-pressure mechanism) provided to the cleaning head of the optical connector cleaning instrument shown in FIG. 1.

FIG. 3B is a cross-sectional view showing the vertical position holding mechanism provided to the cleaning head of the optical connector cleaning instrument shown in FIG. 1.

DETAILED DESCRIPTION OF THE PREFERRED EMBODIMENTS

The present invention's optical connector cleaning instrument will now be explained in greater detail with reference to the accompanying figures.

FIGS. 1A and 1B show a preferred embodiment of the present invention's optical connector cleaning instrument. The optical connector cleaning instrument in these figures is indicated by the numeric symbol 1. This optical connector cleaning instrument 1 is for cleaning the ends of an optical connector, and is composed of a cleaning head 2 and an operating handle 3 which is attached to the back surface of this cleaning head 2.

Figure 2:
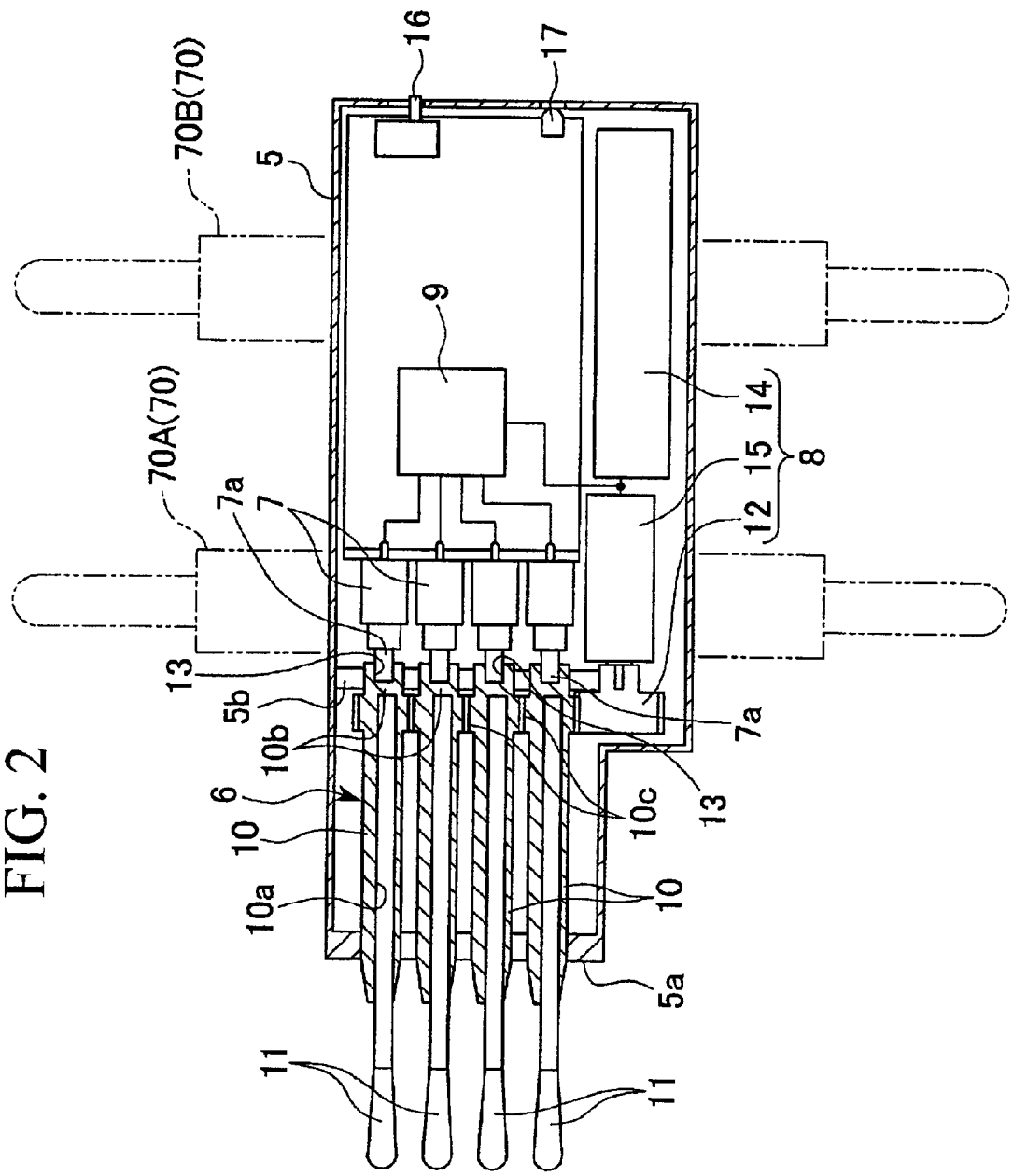
FIG. 2 is a lateral cross-sectional view showing the cleaning head of the optical connector cleaning instrument shown in FIG. 1.

The cleaning head 2 has a head main body 4 and a vertical position holding mechanism 70. As shown in FIG. 2, the head main body 4 is designed so that cleaning member holder 6, a plurality of switches 7, driver 8, and controller 9 are housed inside a case 5. The cleaning member holder 6 has a plurality (4 in this example) of cylindrically shaped holding tubes 10, sealed on one side (the rear end side) and arrayed parallel to one another. The other side (i.e., the front end side) of these holding tubes 10 are directed toward a front face 5a of the cleaning head 2, and is disposed so as to project out slightly beyond the front face 5a.

These holding tubes 10 are attached and held in between the front face 5a of the case 5 and an attaching wall 5b which is formed inside case 5, so as to permit their rotation, advance and withdrawal, and a cleaning member 11 consisting of a cotton swab is held by being inserted into a hole 10a of each holding tube 10. The inner diameter of the hole 10a of the holding tube 10 is formed to be approximately equal to the outer diameter of the shaft portion of the cotton swab (i.e., cleaning member 11). As a result, the hole 10a firmly holds the shaft of the inserted cleaning member 11, and is designed to rotate together with the cleaning member 11 without any skid when the cleaning operation is performed by rotating the cleaning member 11, which will be discussed below. Note that the method for holding the cleaning members 11 in the cleaning member holder 6 is not particularly restricted. In addition, each holding tube 10 may operate independently, with their positions adjusted forward or back along the axial direction.

In this hole 10a, the distance from the open side (front end side) of the hole to its sealed part 10b, which closes the hole 10a, is sufficiently shorter than the shaft portion of the cotton swab (cleaning member 11) employed. As a result, the cotton portion (head) of the cotton swab (cleaning member 11) projects sufficiently beyond the opening of hole 10a.

The center axis of the hole 10a is not designed to exactly coincide with the center axis of the holding tube 10, but rather is formed to deviate therefrom (i.e., is eccentric to). As a result, when the holding tube 10 is rotated in the circumferential direction about its center axis, the center axis of the hole 10a rotates to the outside of the axis of rotation of the holding tube 10.

Gears 10c are respectively formed to rear end side of these holding tubes 10. These gears 10c engage in between the neighboring holding tubes 10. The gear 10c of the holding tube 10 on the side where the driver 8 is provided engage with the driver gear 12. When the driver 8 operates as a result, and the driver gear 12 rotates, this rotational force is transmitted to gear 10c of each holding tube 10. As a result, all of the holding tubes 10 simultaneously rotate. (Note, however, that adjacent holding tubes 10 rotate in opposite directions).

A shaft receiving concavity 13 is formed to the rear end side (i.e., sealed part 10b side) of each holding tube 10, and a switch end 7a of the switch 7 engages in this shaft receiving concavity 13. The switch 7 is a touch switch for initiating the driving operation of the driver 8, and is designed to turn on the driving operation of the driver 8 when the switch end 7a is depressed. End of the cleaning member 11 which has been inserted into and is held by the holding tube 10 comes into contact with and is pressed against the front end of the optical connector, causing the holding tube 10 to be pressed backward in response, so that the switch end 7a is depressed and turned on as a result. In this example, the switches 7 are provided independently to each holding tube 10. These switches 7 are electrically connected to a controller 9. A pressure-detecting touch switch, for example, may be employed as this type of switch 7.

The shaft receiving concavity 13 is formed on the center axis of the holding tube 10. Accordingly, the switch end 7a of the switch 7 which engages in this shaft receiving concavity 13 is aligned with the center axis of the holding tube 10. In this design, when the drive gears 12 rotate due to the operation of the driver 8, with the holding tubes 10 simultaneously rotating, these holding tubes 10 rotate while employing the switch ends 7a, which coincide with the center axis of the holding tubes 10, as the rotational axis.

The controller 9 controls the drive operation of the driver 8 and is electrically connected to all switches 7. When one or all of switches 7 are turned on, the controller 9 receives this signal and initiates the driving operation of the driver 8. A timer (not shown in the figures) is incorporated into the controller 9. When the driving operation of the driver 8 is turned on by the switch 7, the controller 9 controls the drive operation of the driver 8 so that it automatically turns off after the elapse of a pre-set period of time 5 or 10 seconds, for example. An operating panel (not shown) is provided to the back surface of the case 5, i.e., the surface on the side where the operating handle 3 is attached. An adjuster (not shown) for adjusting the set value of the timer is provided on the operating panel. The period of time during which the driver 8 is operated, i.e., the period of time from when the driving operation of the driver 8 is turned on until it automatically stops, can be optionally changed by the user's adjustment of the timer set values at the adjuster.

The driver 8 is composed of electrical source 14, motor 15, and the driver gears 12. The controller 9 controls the ON/OFF state of the electric connection between the electrical source 14 and motor 15. The electrical source 14 is one or a plurality of batteries, for example, and can function as the electrical source for the controller 9 and a notifying means that will be described below. Note that a part or all of the case 5 can be opened and closed to facilitate battery exchange.

The drive gears 12 are attached to the rotational shaft of the motor 15. Thus, the rotational force of motor 15 is transmitted to all the holding tubes 10 via the drive gears 12. A program for controlling the rotation of the motor 15 is housed inside the controller 9. Using this program, the rotation of the motor 15 can be controlled from start to finish to maintain a constant speed, to increase or decrease the speed, or to reverse the direction of rotation of the motor 15. A commercially available servo-motor can be inexpensively employed as the motor 15 that permits this type of variable control of the speed and direction of rotation. Setting of the speed and direction of rotation of the motor 15 from this program is carried out using the operating panel.

Main switch 16 and notifying means 17 are electrically connected to the controller 9. This main switch 16 and notifying means 17 are provided to the operating panel described above. The main switch 16 is for turning on and off the electrical connection between the power source 14 and each of the compositional elements connected to it. The notifying means 17 shown in the figures consists of a lamp such as an LED (light emitting diode) or LD (laser diode). When the motor 15 of driver 8 is driven, the notifying means 17 is illuminated to notify the user that the motor 15 is operating. When the motor 15 is not being driven, the lamp is not illuminated. The ON/OFF state of the illumination of the notifying means 17 is controlled simultaneously with the control of the motor 15 by the controller 9. Alternatively, the notifying means 17 may also be designed to distinguish between the operating or non-operating states of the motor 15 by changing the light from the lamp.

The switch 7 functions as a contact signal outputter for outputting a signal (also referred to as "contact signal" hereinafter) when the end of the cleaning member 11 comes in contact with the end of the optical connector (the optical connector 18 discussed below, for example) that is to be cleaned. The notifying means functions to notify the user that the end of the cleaning member has come in contact with the end of the optical connector based on the output of the contact signal from contact signal outputter.

The contact signal outputter is not restricted to the switch 7, the pressure-detecting type touch switch as described above. Rather, a variety of designs, such as an optical switch 38 explained below, can be employed, for example. In addition, the notifying means was exemplified here by a design in which the user was notified that the end of the cleaning members had come in contact with the end of the optical connector using the drive commands from the controller 9 based on the output of a contact signal from the contact signal outputter. However, it is not essential that the notifying means be driven according to the control of the controller 9. Rather, the notifying means may be operated by receiving the contact signal from the contact signal ouputter. The notifying means is not restricted to a specific design. For example, it may have a design in which there is visual notification using a lamp such as an LED or a mechanical display in which a colored member is projected, or a design in which there is auditory notification using output of a sound, cessation of sound output, or a variation in sound output.

It is also acceptable to employ a design in the optical connector cleaning instrument 1 in which a connecting terminal is provided to the cleaning head 2 which electrically connects the contact signal outputter (switch 7) and/or the controller 9 to an outside device.

A design may also be employed in the optical connector cleaning instrument 1 in which the signal output from the controller 9 in response to the contact signal output from the contact signal outputter, or the contact signal from the contact signal ouputter, can be output to an external device via a connecting terminal. In this case, driving of the external device can be linked to the output of the contact signal from the contact signal outputter. As a result, a device can be employed which functions as the aforementioned notifying means and as the external device connecting to the connecting terminal.

As shown in FIGS. 1A and 1B, vertical position holding mechanisms 70 are provided in a plurality of different sites from front to rear on the lateral surface of one side of the head main body 4. Note that in this example, the vertical position holding mechanisms 70 are provided at two sites along the front-to-back direction of the head main body 4. Accordingly, to discriminate between these two mechanisms 70 in the following discussion, the forward vertical position holding mechanisms 70 will be denoted by the symbol "70A", while the rear vertical position holding mechanisms 70 will be denoted by the symbol "70B".

FIGS. 3A and 3B show the vertical position holding mechanism 70. FIG. 3A is a planar view (planar view showing a top push-pressure mechanism 77 discussed below) and 3B is a lateral view in cross-section.

As shown in FIGS. 3A and 3B, the vertical position holding mechanism 70 is provided with a cylindrically shaped main body 71 which is attached at an orientation extending above and below the side portion of the case 5 of the head main body 4; a guide piece 72 (also referred to as "upper guide piece" hereinafter) which is inserted into the upper end portion 71a of the cylindrically shaped main body 71 and can be raised or lowered; a guide piece 73 (also referred to as "lower guide piece" hereinafter) of the cylindrically shaped main body 71 which is inserted into the lower end portion 71b and can be raised and lowered; spring receiver 74 which is fixed in place inside cylindrically shaped main body 71; an elastic member 75 (a coil spring here) which is disposed in between the upper guide piece 72 and spring receiver 74; and an elastic member 76 (a coil spring here) which is disposed in between the lower guide piece 73 and spring receiver 74.

The upper end portion 71a of the cylindrically shaped main body 71, upper guide piece 72, elastic member 75 and spring receiver 74 form the top push-pressure mechanism 77. The lower guide piece 73, elastic member 76 and spring receiver 74 form a bottom push-pressure mechanism 78. Note that the top push-pressure mechanism 77 and bottom push-pressure mechanism 78 have the same design.

In the top push-pressure mechanism 77, part of the upper guide piece 72 projects upward from the upper end portion 71a of the cylindrically shaped main body. By pressing the upper guide member 72 downward and elastically deforming the elastic member 75, it is possible to decrease the dimensions by which the upper guide piece 72 projects upward from the upper end portion 71a of the cylindrically shaped main body. In the bottom push-pressure mechanism 78, part of the lower guide piece 73 projects downward from the lower end portion 71b of the cylindrically shaped main body. By pressing the lower guide piece 73 upward and elastically deforming the lower guide piece 76, it is possible to decrease the dimensions by which the lower guide piece 73 projects downward from the lower end portion 71b of the cylindrically shaped main body.

Note that the elastic member 75 is connected to the upper guide piece 72 and spring receiver 74, respectively, and the elastic member 76 is connected to the lower guide piece 73 and spring receiver 74, respectively. In addition, the upper guide piece 72 and lower guide piece 73 are connected to the spring receiver 74 via the elastic members 75, 76, respectively. As a result, they cannot be pulled out of the ends (upper end portion 71a or lower end portion 71b) of the cylindrically shaped main body 71.

The projecting end of the upper guide piece 72, which projects out from the upper end (upper end portion 71a of the cylindrically shaped main body) of the vertical position holding mechanism 70, is shaped to enable its insertion into a guide groove 28a which is formed in the lower surface of the upper wall 21a of the plug-in unit 21 (see FIG. 4) explained below, and its sliding movement along the extending direction of this guide groove 28a. The projecting end of the lower guide piece 73, which projects out from the lower end (lower end portion 71b of the cylindrically shaped main body) of the vertical position holding mechanism 70, is shaped to enable its insertion into a guide groove 28b which is formed in the upper surface of the lower wall 21b, and its sliding movement along the extending direction of this guide groove 28b. As a result, in this design, with the upper guide piece 72 inserted into the guide groove 28a of the upper wall 21a and the lower guide piece 73 inserted into the guide groove 28b of the lower wall 21b, the head main body 4 can move smoothly forward or away from the optical connector that is to be cleaned.

As shown in FIGS. 1A and 1B, the operating handle 3 is attached to the rear surface of the head main body 4 by a fixing device (not shown) such as a bolt. An operator part 3a to be held in the hand is formed on the back end (i.e., the end opposite the head main body 4) of the operating handle 3.

Figure 4:
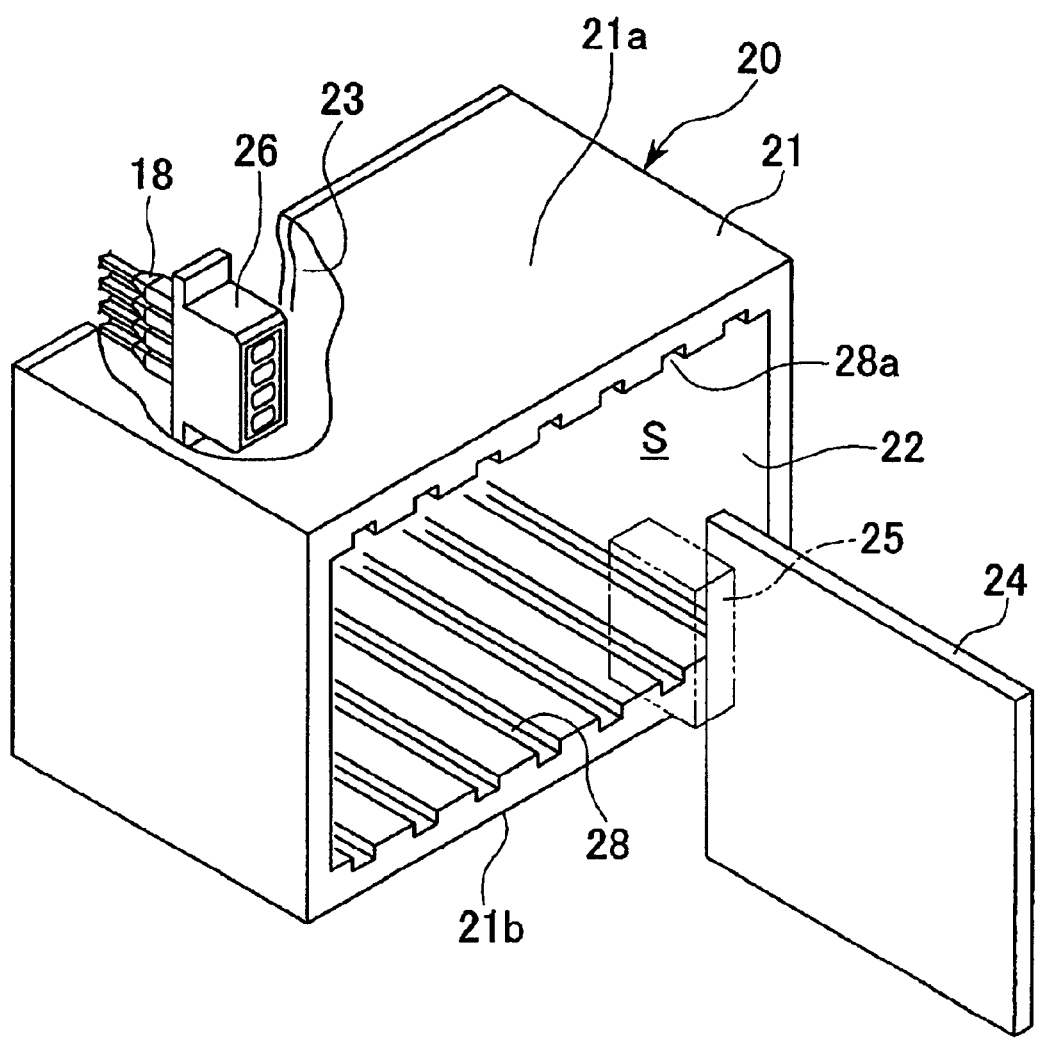
FIG. 4 is a perspective view showing an optical connector (back plane connector) that is to be cleaned using the optical connector cleaning instrument according to the present invention.
Figure 5:
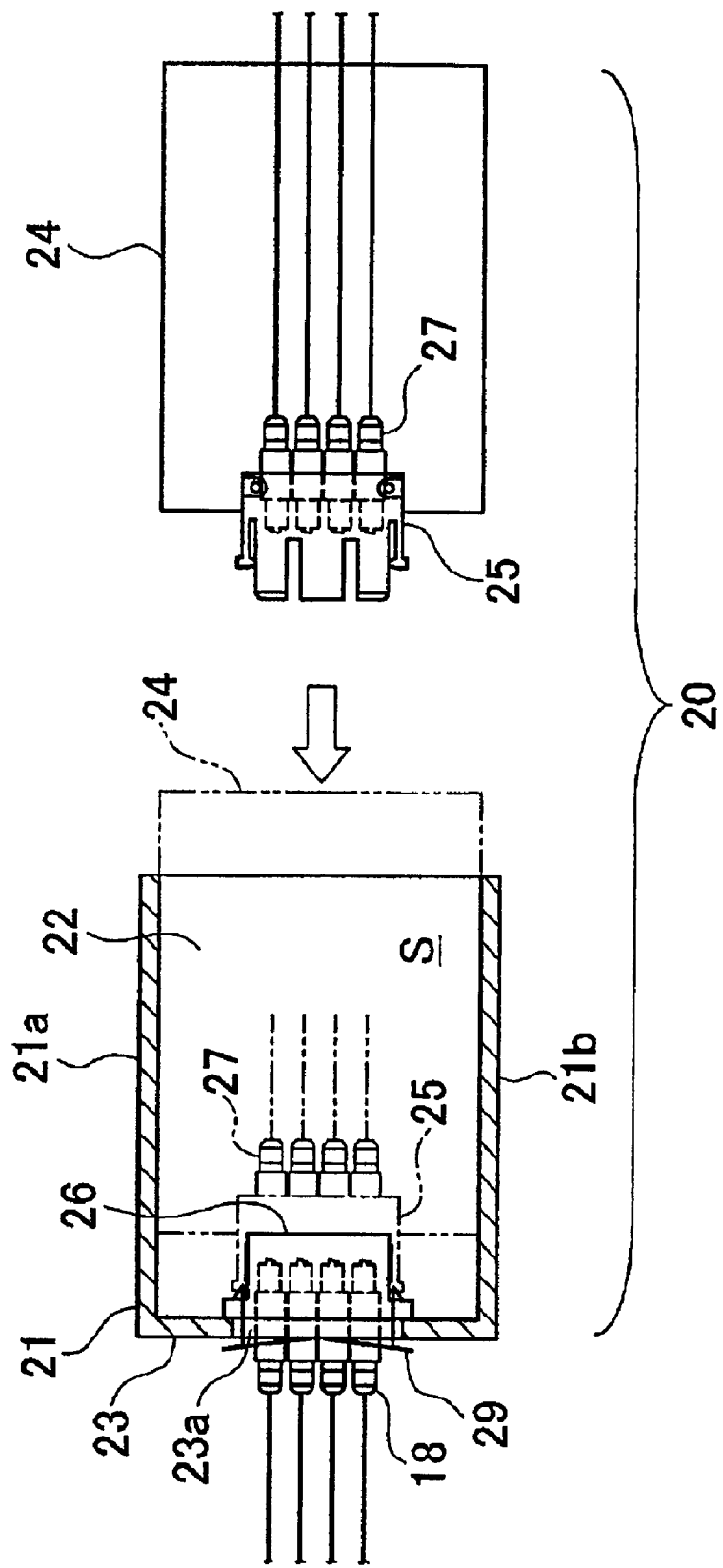
FIG. 5 is a lateral view of the connector (back plane connector) seen in FIG. 4, showing the plug-in-unit in cross-section.

Next, an example of an optical connector which is to be cleaned by the optical connector cleaning instrument 1 having the above-described design will be explained. FIGS. 4 and 5 show an example of the optical connector to be cleaned by the optical connector cleaning instrument 1. FIG. 4 is a perspective view and FIG. 5 is a lateral view in cross-section.

An optical connector 20 shown in FIGS. 4 and 5 is a back plane connector. In this back plane connector, a print board 24 (a printed circuit board) is inserted through an opening 22 of a plug-in unit 21 and directed toward a back plane 23 which is positioned deep inside the plug-in unit 21. As a result, a print board housing 25 (referred to as "PH housing" hereinafter) which is attached to the print board 24 engages with a back plane housing 26 (referred to as "BH housing" hereinafter) which is attached to the back plane 23, thereby connecting an optical connector plug 27 (optical connector plug) attached to the PH housing 25 and the optical connector 18 (optical connector plug) connected to the BH housing 26.

In FIG. 5, the numerical symbol 23a indicates a window that opens on the back plane 23, while numeric symbol 29 is a clip which attaches the BH housing 26 to the back plane 23. This window 23a and clip 29 are shown in enlargement in FIG. 7, but are omitted from FIG. 4, etc. The BH housing 26 is attached to the back plane 23 by the clip 29 to permit a slight amount of rocking. The BH housing 26 is attached on the back plane 23's inside surface which faces an inner space S of the plug-in unit 21, at a site on the back plane 23 corresponding to the window 23a. A plurality (four in this example) of optical connectors 18 is attached in a releasable manner to the BH housing 26 through the window 23a.

Figure 6:
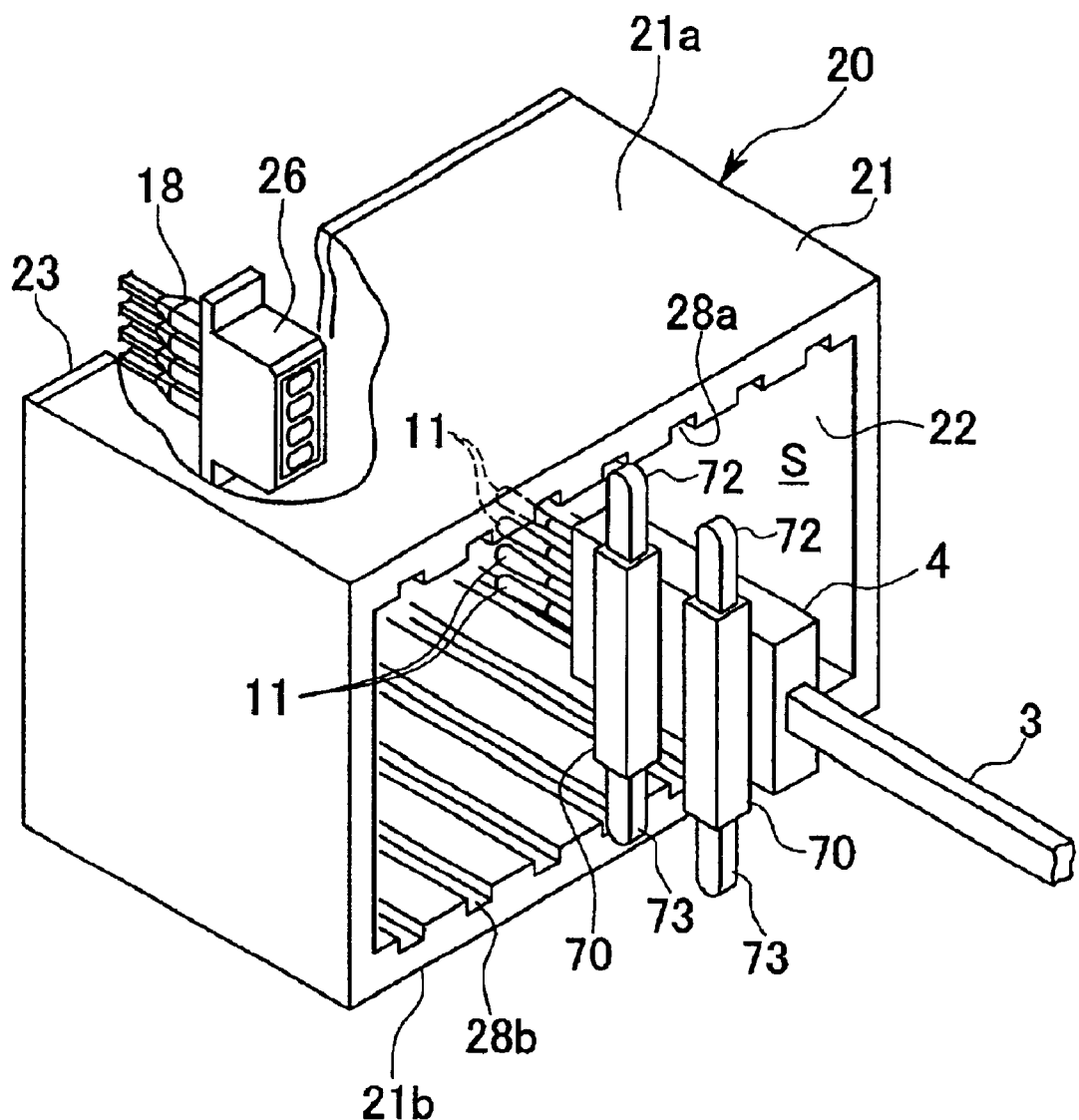
FIG. 6 is a perspective view showing an arrangement in which the cleaning head of the optical connector cleaning instrument shown in FIG. 1 is disposed near the opening of the plug-in-unit.

Note that while not shown in FIGS. 5 and 6, a plurality of windows 23a are formed in horizontal alignment in the back plane 23. Accordingly, the BH housing 26 can be attached to the respective windows 23a in this back plane 23.

The print board 24 is inserted into guide grooves 28a, 28b which are formed to an upper wall 21a and a lower wall 21b of the plug-in unit 21 on the inside surfaces that face the inner space S, with the print board 24 moving by sliding along the guide grooves 28a, 28b. The guide grooves 28a, 28b are formed extending straight between the vicinity of the back plane 23 and plug-in unit 21, to open onto the opening 22. A plurality of guide grooves 28a, 28b are formed in a horizontal and parallel array to the upper wall 21a and lower wall 21b of the plug-in unit 21, corresponding to the BH housing 26 (horizontal array omitted from figures), a plurality of which are attached in a horizontal array to the back plane 23.

In this design, by inserting the print board 24 into the pair of upper and lower guide grooves 28a, 28b corresponding to the BH housing 26 to be connected to the PH housing 25, the PH housing 25 can be positioned at and moved toward or away from this BH housing 26. By pushing the print board 24, which was inserted into the plug-in unit 21 via the opening 22, along the guide grooves 28a, 28b toward the back plane 23, the PH housing 25 can be engaged in the BH housing 26. By pulling the print board 24 from the opening 22 side of the plug-in unit 21, the PH housing 25 is separated from the BH housing 26 and the connection between the optical connectors 18 and 27 can be released.

Note that the upper wall 21a and lower wall 21b can function as guide members for guiding the print board 24 of the head main body 4 of the optical connector cleaning instrument 1.

The guide grooves 28a, 28b of the plug-in unit 21 are formed in a horizontal and parallel array corresponding to the window 23a of the back plane 23. By inserting the print board 24 into the pair of guide grooves 28a, 28b corresponding to the window 23a, the PH housing 25 can be engaged in the BH housing 26.

Figure 7:
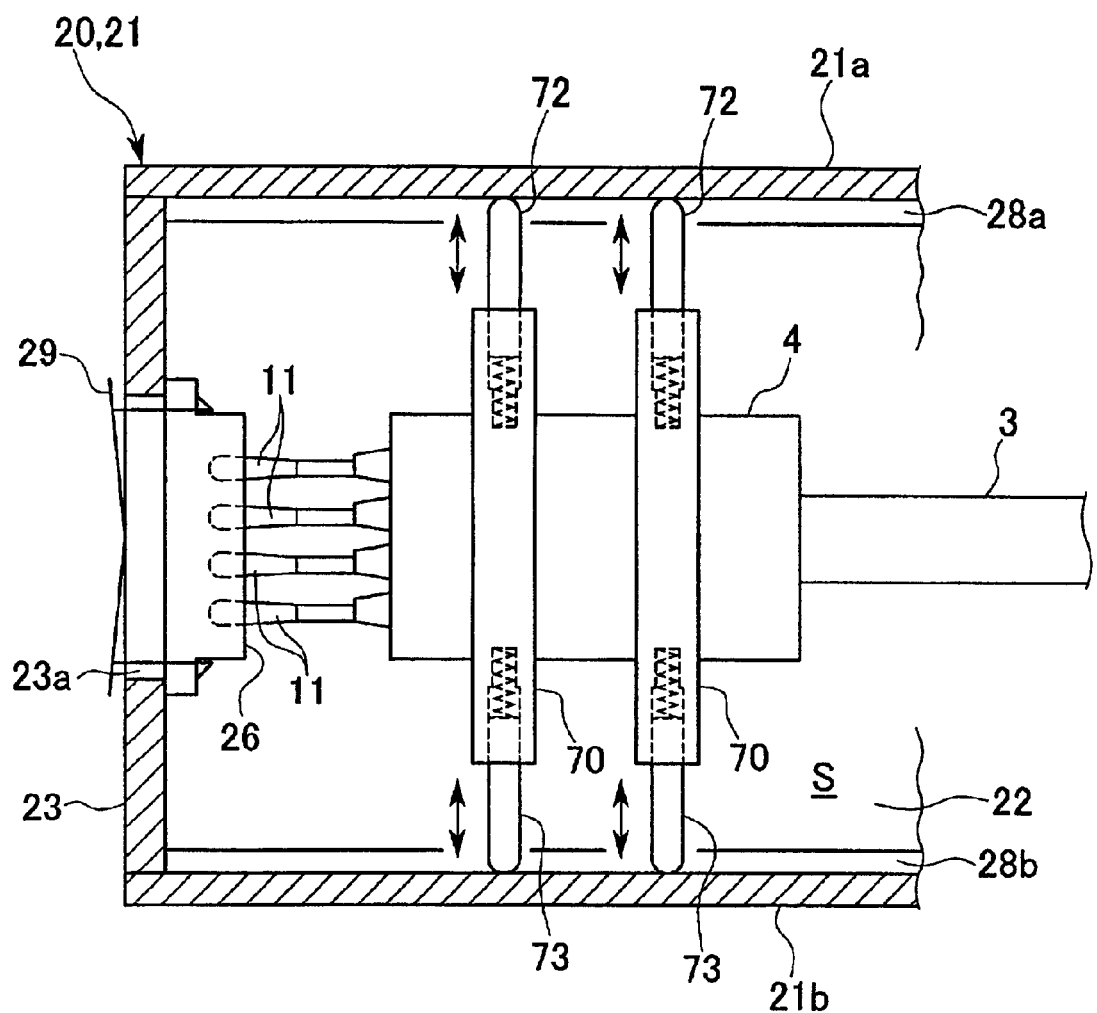
FIG. 7 is a view schematically showing an arrangement in which the cleaning head of the optical connector cleaning instrument shown in FIG. 1 is inserted into the plug-in-unit.

Next, the method for using the optical connector cleaning instrument 1 to clean the optical connector 18 of the optical connector 20 having the design described above will be explained with reference to FIGS. 6 and 7, etc. FIG. 6 is a perspective view showing the disposition of the optical connector cleaning instrument 1 of this example near opening 22 of the plug-in unit 21. FIG. 7 is a lateral view in cross-section showing the vicinity of the cleaning head 2 of the optical connector cleaning instrument 1 which has been inserted into the plug-in unit 21.

In order to clean the optical connector 18 using this optical connector cleaning instrument 1, the cleaning members 11 consisting of cotton swabs are first inserted into the hole 10a of each holding tube 10, and fixed in place there. As needed, the cotton portion of the cotton swab may be soaked with alcohol.

Next, the main switch 16 is turned on and the operator part 3a of the operating handle 3 is manipulated to insert the head main body 4 through the opening 22 of the plug-in unit 21 into the inner space S (i.e., the area between the upper wall 21a and lower wall 21b), as shown in FIGS. 6 and 7.

The upper guide piece 72 which projects out from the upper end of the vertical position holding mechanisms 70A, 70B attached to the head main body 4 is inserted into the guide groove 28a in the upper wall 21a of the plug-in unit 21, while the lower guide piece 73 which projects out from the lower end of the vertical position holding mechanisms 70A, 70B is inserted into the guide groove 28b in the lower wall 21b of the plug-in unit 21. In FIG. 6, the distance between the top end of the upper guide piece 72 and the bottom end of the lower guide piece 73 of the vertical position holding mechanism 70 is designed to be slightly larger than the distance between the bottom face (i.e., upper bottom face) of the guide groove 28a of the upper wall 21a and the bottom face of the guide groove 28b formed in the lower wall 21b of the plug-in unit 21 (hereinafter, this latter distance between the bottom faces will be referred to as "distance between the upper and lower guide grooves 28a, 28b").

For this reason, as shown in FIG. 7, when the head main body 4 is inserted into the plug-in unit 21, the upper guide piece 72 is pressed against the upper wall 21a, and the lower guide piece 73 is pressed against the lower wall 21b, due to the applied momentum of the elastic members 75, 76 which are being compressed with the decrease in the space between the upper guide piece 72 and lower guide piece 73. As a result, the head main body 4 can be positioned at a site (site along the vertical direction) with respect to the BH housing 26 where the cleaning members 11 on the front face 5a side of the case 5 can be pushed into contact with the BH housing 26. In addition, in this optical connector cleaning instrument 1, the vertical position holding mechanisms 70A, 70B provided at a plurality of different positions along the front-to-rear direction of the head main body 4 are employed to hold the head main body 4 inserted into the plug-in unit 21 in a position where its front face 5a side faces the BH housing 26.

Figure 8:
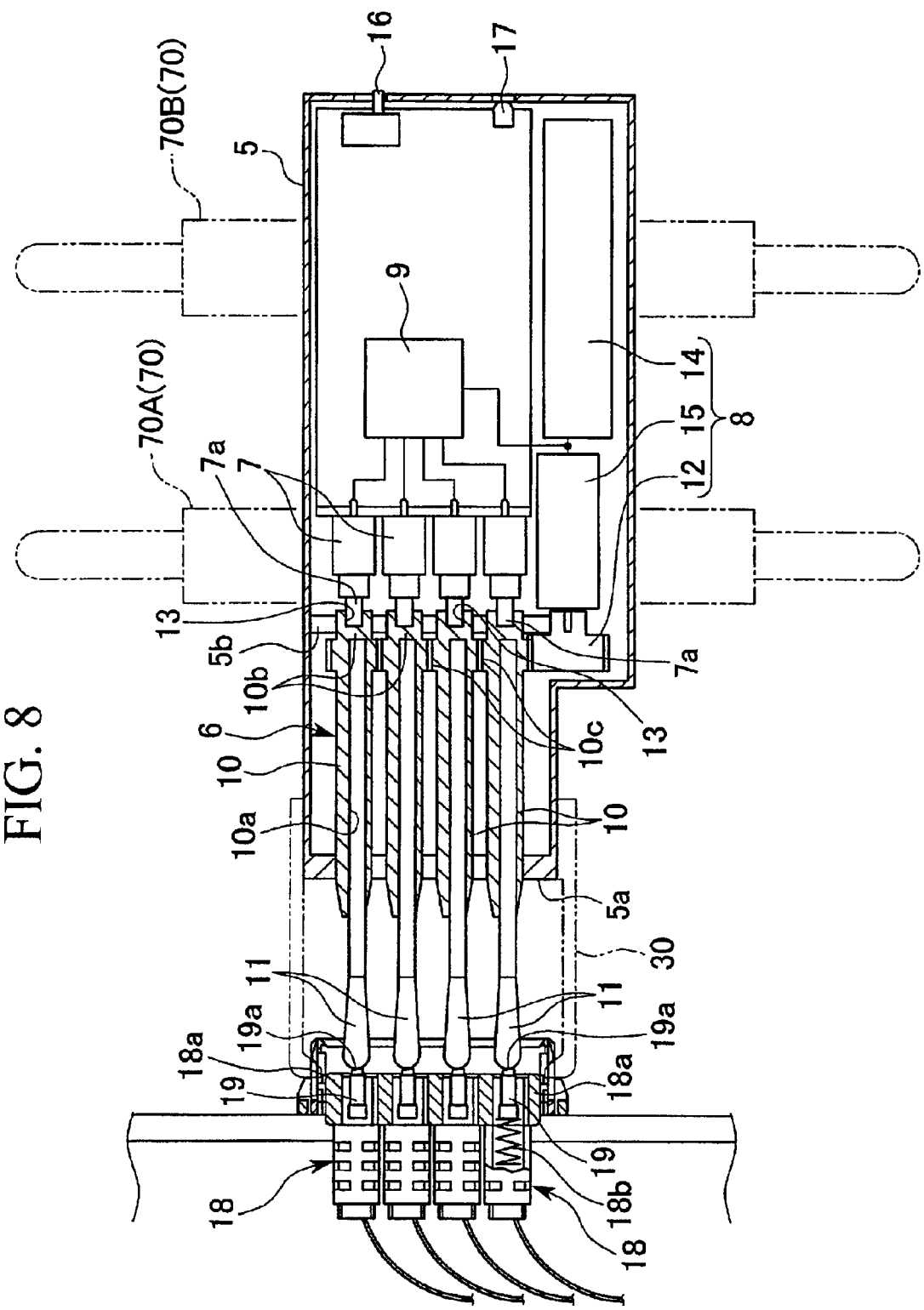
FIG. 8 is a side plane cross-sectional view showing an arrangement in which the cleaning member of the optical connector cleaning instrument shown in FIG. 1 is pressed against the connector end face of the optical connector.

Accordingly, by pushing te head main body 4 into the back plane 23, with the upper guide piece 72 and lower guide piece 73 inserted into the guide grooves 28a, 28b, the cleaning members 11 on the front face 5a side of the head main body 4 can be pushed into contact with the end of the optical connector 18 which is connected to the BH housing 26, as shown in FIG. 8.

When the cleaning members 11 are pressed into contact with the end of the optical connector 18 in this way, the holding tubes 10 are pressed backward by the reactive force of the cleaning members 11 as described above. As a result, the switch end 7a is depressed, the switch 7 turning on. With the switch 7 turned on in this way, the controller 9 which has received this signal initiates driving of the driver 8. Then, the motor 15 rotates, simultaneously rotating all of the holding tubes 10 and their cleaning members 11 in accompaniment. As a result, the end of the optical connector 18 is automatically polished and cleaned by the rotation of the cleaning members 11 made of cotton swabs.

Note that when the switch 7 is turned on in this way, the notifying means 17 is also illuminated. Accordingly, with the illumination of the informing mean 17, the user is able to confirm that cleaning has begun. It is also acceptable to design the informing means 17 so that it is not linked to the switch 7, but rather it simply displays that the cleaning members 11 have come into contact with the end of the optical connector 18. In this case (i.e., when the notifying means 17 is not linked to the switch 7), it is acceptable to employ a design in which the user recognizes this display, and manually turns on a special operating switch that is provided on the operating panel described above to start the motor 8.

The timer on the controller 9 is turned on when the motor 8 is started as described above. Once a preset period of time on the timer elapses, the controller 9 automatically turns off the driving action of the driver 8, and the motor 15 stops, halting the cleaning action from the rotation of the cleaning members 11. Once the driving action of the driver 8 has been turned off in this way, the illumination of the notifying means 17 also stops, signaling to the user that cleaning is complete. This also applies to the case where a change in lamp color or a sound is used for the notifying means 17.

Accordingly, through the user's recognition via the notifying means 17 that cleaning is complete and cleaning of the optical connector cleaning instrument 1 has automatically stopped, the optical connector cleaning instrument 1 can be withdrawn from the inside of the plug-in unit 21 and a shift to the next operation can be quickly accomplished.

In this type of optical connector cleaning instrument 1, the driver 8 was controlled by the controller 9 housing a timer, so that the driving action of the driver 8 was halted after a preset period of time had elapsed from initiation of the driving operation. As a result, the cleaning action of the cleaning members 11 can be halted after a specific period of time has elapsed since the start of cleaning. Thus, such undesirable situations as excessive cleaning of the end of the optical connector 18 by the cleaning members 11, the effect of removed dusts, for example, can be avoided.

By providing the notifying means 17, it is possible to confirm the beginning and end of the cleaning operation, improving operability.

A plurality of cleaning members 11 are provided in this optical connector cleaning instrument 1, and the cleaning action of these cleaning members 11 is carried out simultaneously. As a result, even in the case where a plurality of optical connectors 18 are to be cleaned, these optical connectors 18 can be cleaned at the same time with a single operation, so that more efficient cleaning is possible.

The switch 7 is turned on as a result of the cleaning members 11 coming into contact with the end of the optical connector 18, initiating the driving operation of the driver 8. As a result, the end of the optical connector 18 can be cleaned by the cleaning members 11 with certainty.

Even in the case where only one optical connector 18 is housed in the BH housing 26, the plurality of cleaning members 11 provided are each connected to the switch 7, so that the switch 7 is turned on regardless of the position where the optical connector 18 is housed, and cleaning can be carried out.

The center axis of the hole 10a of the holding tube 10 is not formed to coincide with the center axis of the holding tube 10, but rather deviates therefrom (i.e., is eccentric to). As a result, when the holding tube 10 rotates circumferentially about its center axis, the center axis of the hole 10a rotates to the outside of the rotational axis of the holding tube 10. Therefore, the cleaning members 11 held in the holes 10a also rotate to the outside of this rotational axis, making is possible to widen the cleaning area. Accordingly, even if the position of the cleaning members 11 deviates slightly with respect to the end of the optical connector 18, this is covered by the wider cleaning area so that the end of the optical connector 18 can be cleaned with certainty.

The cleaning of the BH housing 26 which is attached to the back plane 23 deep inside the plug-in unit 21 is difficult to carry out by directly inserting a hand into the unit. Using the optical connector cleaning instrument 1 of this example, however, the cleaning members 11 on the front face 5a side of the head main body 4 can be pressed against the end of the optical connector 18 attached to the BH housing 26 simply by inserting the upper guide piece 72 and lower guide piece 73 into the guide grooves 28a, 28b and pushing the head main body 4 into the interior of the plug-in unit 21 (i.e., toward back plane 23). Accordingly, the connector end face 19a of the ferrule 19 of the optical connector 18 can be cleaned very efficiently.

Note that, as is clear from FIGS. 1A and 1B, the head main body 4, which has the external appearance of a thin plate, is connected in an orientation so that its planar direction is parallel to the operating handle 3, which is flat in cross section. Thus, almost the entire optical connector cleaning instrument 1 is flat in form. Accordingly, this optical connector cleaning instrument 1 can be easily inserted into even a narrow work space, and the cleaning operation can be carried out efficiently.

He guide pieces 72, 73 can be pushed into the head main body 4 side based on the elastic deformation limits of the elastic members 75, 76. As a result, the distance between the top end of the upper guide piece 72 and bottom end of lower guide piece 73 in the vertical position holding mechanism 70 can be varied (i.e., the extension or compression of the vertical position holding mechanism 70 is possible). For this reason, even if deformities arises such as a change in the distance between the upper and lower guide grooves 28a, 28b due to deterioration of the plug-in unit 21 over time (including local variation in distance along the extending direction of the guide grooves 28a, 28b, as well as variation along the entire extending direction of the guide grooves 28a, 28b), this change in distance can be absorbed by varying the extension or compression of the vertical position holding mechanism 70, i.e., by changing the amount by which each guide piece 72, 73 projects beyond the head main body 4. Thus, movement of the head main body 4 toward or away from the BH housing 26 can be carried out smoothly.

Even if the distance between the upper and lower guide grooves 28a, 28b becomes locally wider or narrower somewhere along the length of the grooves, the amount by which each guide piece 72, 73 projects out from the head main body 4 changes according to the applied momentum of elastic members 75, 76, so that the guide pieces 72, 73 closely follow the guide grooves 28a, 28b {specifically, the bottom face of the guide groove 28a (i.e., the upper bottom face) in the upper wall 21a and the bottom face of the guide groove 28b formed in the lower wall 21b in the plug-in unit 21}. Accordingly, it is possible to avoid such undesirable circumstances as the upper or lower guide piece 72, 73 separating from the guide groove 28a or guide groove 28b when the head main body 4 is moving toward or away from the BH housing 26.

The applied momentum of the elastic members 75, 76 is designed to act approximately equally on the upper and lower guide pieces 72, 73. Accordingly even if the distance between the upper and lower guide grooves 28a, 28b varies, the head main body 4 can be held stably at a position which enables the cleaning members 11 to be pushed into contact with the BH housing 26.

Note that it is not necessary that the upper and lower guide pieces 72, 73 be constantly pressed against the upper wall 21a and lower wall 21b by the applied momentum of the elastic members 75, 76. Rather, it is sufficient simply that the upper and lower guide pieces 72, 73 do not become separated from the guide grooves.

The optical connector cleaning instrument 1 in which the vertical position holding mechanism 70 as described above is present in the head main body 4 can achieve excellent general purposefulness with respect to the various dimensions, etc., of the plug-in unit 21. In other words, in this optical connector cleaning instrument 1, differences in the distance between the upper and lower guide grooves of the plug-in unit are compensated for by the elastic deformation of the elastic members 75, 76 (i.e., the extension or compression of the vertical position holding mechanism 70 here). As a result, the guide pieces 72, 73 on either side facing the head main body 4 are inserted into the guide grooves to enable their sliding movement, permitting insertion of the head main body 4 inside the plug-in unit. In this case as well, by the sliding guide pieces 72, 73 along the upper and lower guide grooves, the head main body 4 can be moved toward and away from the BH housing 26 and the end of optical connector 18 can be cleaned by the cleaning members 11 of the head main body 4.

The optical connector 18 discussed here is a MPO (Multifiber Push On) type optical connector defined according to JIS C 5982. This optical connector 18 is an optical connector plug formed by incorporating an MT (Mechanically Transferable) type optical connector defined according to JIS C 5981 as the ferrule 19 (optical connector ferrule) in the plastic housing 18a. In this optical connector 18, the rear end of the ferrule 19 is subjected to an applied force by a coil spring 18b and, as a result, its front end projected out beyond the front end of the housing 18a. Thus, by simply pressing the head main body 4 against the BH housing 26, the cleaning members 11 can be brought into contact with the connector end face 19a at the front end of the ferrule 19.

This optical connector cleaning instrument 1 is designed so that the switch 7 is turned on when the cleaning member 11 is pressed against the connector end face 19a at the front end of the ferrule 19. Accordingly, it is desirable to make the pushing pressure necessary to turn the switch 7 on sufficiently smaller than the pressure at which the ferrule 19, opposing the applied force of the coil spring 18b, would be pulled inside the housing 18a, i.e., it is desirable to make the pushing pressure necessary to turn on the switch 7 sufficiently smaller than the applied pressure of the coil spring 18b. For example, in the case of the MPO type optical connector in which the MT type optical connector is employed as the ferrule 19, the applied pressure of the coil spring 18b is approximately 9.8N (1 kg). Therefore, the pushing pressure to turn on the switch 7 is preferably set to a sufficiently smaller value of 2N (200 g). Note that this type of pressure adjustment is preferably carried out by wrapping a coil spring around the outer periphery of the holding tubes 10, or attaching a momentum-applying member to the holding tubes 10.

The optical connector to be cleaned is not restricted to the above-described optical connector 18. Rather, optical connectors of various designs may be employed. For example, an optical connector in which the front end of the ferrule 19 does not project out from the front end of the housing 18a of the optical connector, but rather is slightly recessed inside the housing 18a may be employed.

The optical connector cleaning instrument 1 of the present invention can perform excellent cleaning of this type of optical connector as well. Namely, since cleaning is performed by rotating the cleaning members 11 consisting of cotton swabs, by inserting these cleaning members 11 inside the housing 18a, the end of the optical connector can be cleaned in the same manner as the optical connector 18 described above which has its front end projecting out from the housing.

The optical connector cleaning instrument 1 of the present invention can also be used for optical connectors other than those provided to the BH housing 26 attached to the back plane 23 deep inside the plug-in unit 21.

Note that the optical connector cleaning instrument of the present invention is not limited to the designs exemplified above. Rather, a variety of modifications are possible provided they do not depart from the spirit of the invention.

For example, as shown by the two-dot chain line in FIG. 8, an engaging part 30 may be provided to the front face 5a side of the head main body 4 for engaging with the BH housing 26. This engaging part 30 can also function as a guide member for guiding the cleaning members 11 to, and positioning them at, the front end of the optical connector 18. This engaging part 30 can have the same shape as the part for engaging with the BH housing 26 which is formed to the front face side of the print board housing 25 shown in FIG. 5, for example. If this type of engaging part 30 is provided to the front face 5a side of the head main body 4, it will engage in the BH housing 26 with the engaging part 30 externally inserted into the BH housing 26, as shown by the two-dot chain line in FIG. 8, when the head main body 4 of optical connector cleaning instrument 1 is inserted into the plug-in unit 21. As a result, the cleaning members 11 are positioned so that they will definitely come into contact with the end of the optical connector 18. Accordingly, even when the end of the optical connector 18 is in a hard to visualize spot, it can be cleaned with certainty by the cleaning members 11.

The driver in the optical connector cleaning instrument of the present invention is not limited to a motor driving method. Rather, provided the driving method can drive the cleaning members by rotation, etc., then driving methods of all various embodiments may be employed.

In addition to a method in which switching is performed after detecting the shaft pressure of the cleaning members, the switch for initiating the driving action of the driver may also be a type which detects the shaft's movement or position, such as for example, a non-contact type optical switch described below, or may be a switch using various detection methods. In addition, a method may also be employed in which the switching operation is performed manually by detecting when the cleaning members come into contact with the area to be cleaned.

Figure 9:
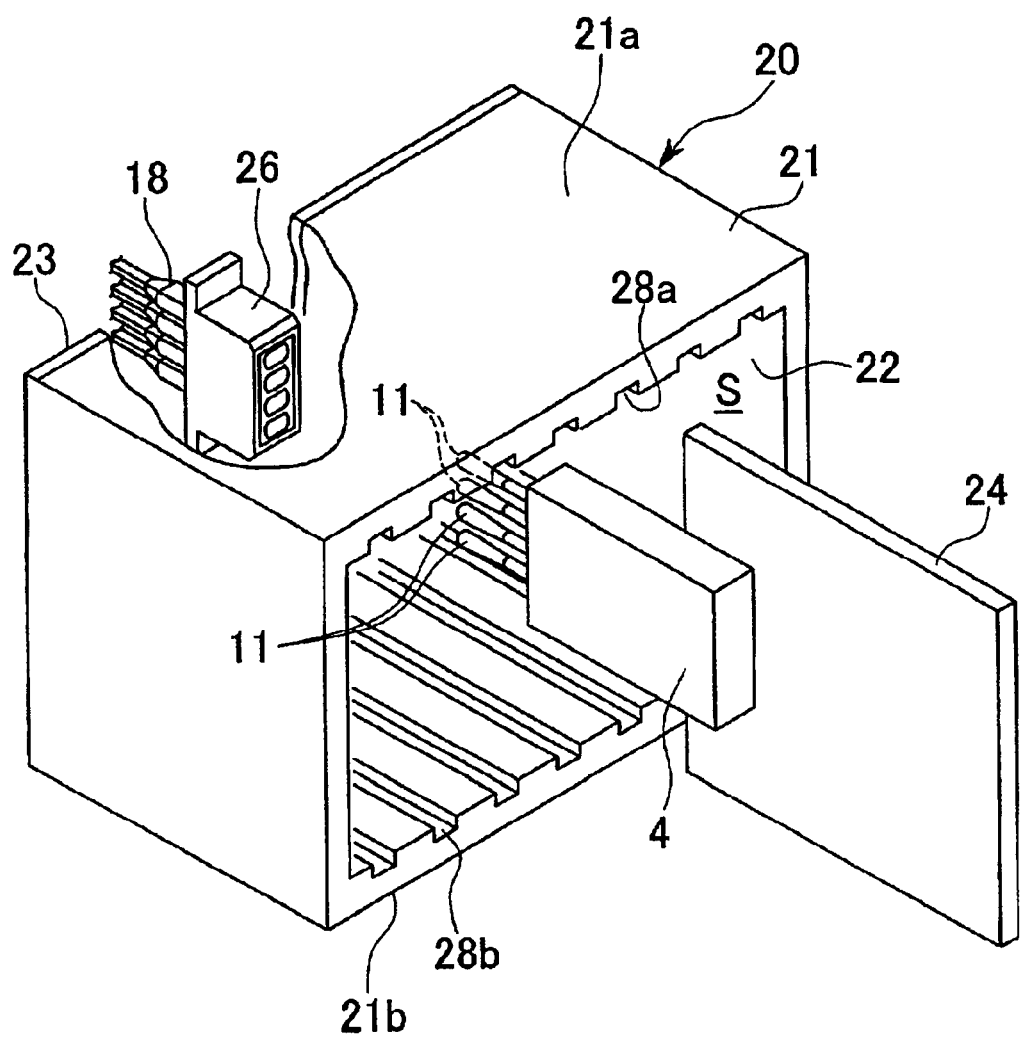
FIG. 9 is a perspective view showing an example in which the main body of the head has been directly attached to a print board.

It is also acceptable to directly attach the head main body 4 to the print board 24 as shown in FIG. 9, without providing the vertical position holding mechanism 70 or operating handle 3. In other words, in place of providing the print board housing 25 to the print board 24, the head main body 4 may be provided at that position. By providing this design, the end of the optical connector can be cleaned with certainty as a result of inserting the print board 24 into the plug-in unit 21 in the same manner as usually employed. Note that in this case, some laxity may be provided in the attachment of the head main body 4 to the print board 24. As a result of this type of attachment, positional deviation, particularly in the case where there is a slight deviation in the positions of the engaging part 30 and the back plane housing 26, can be corrected and engagement can be carried out easily.

It is also acceptable to attach the head main body 33 to a board like the print board 24, and then provide the vertical position holding mechanism 70 to this board.

Figures 10A, 10B:
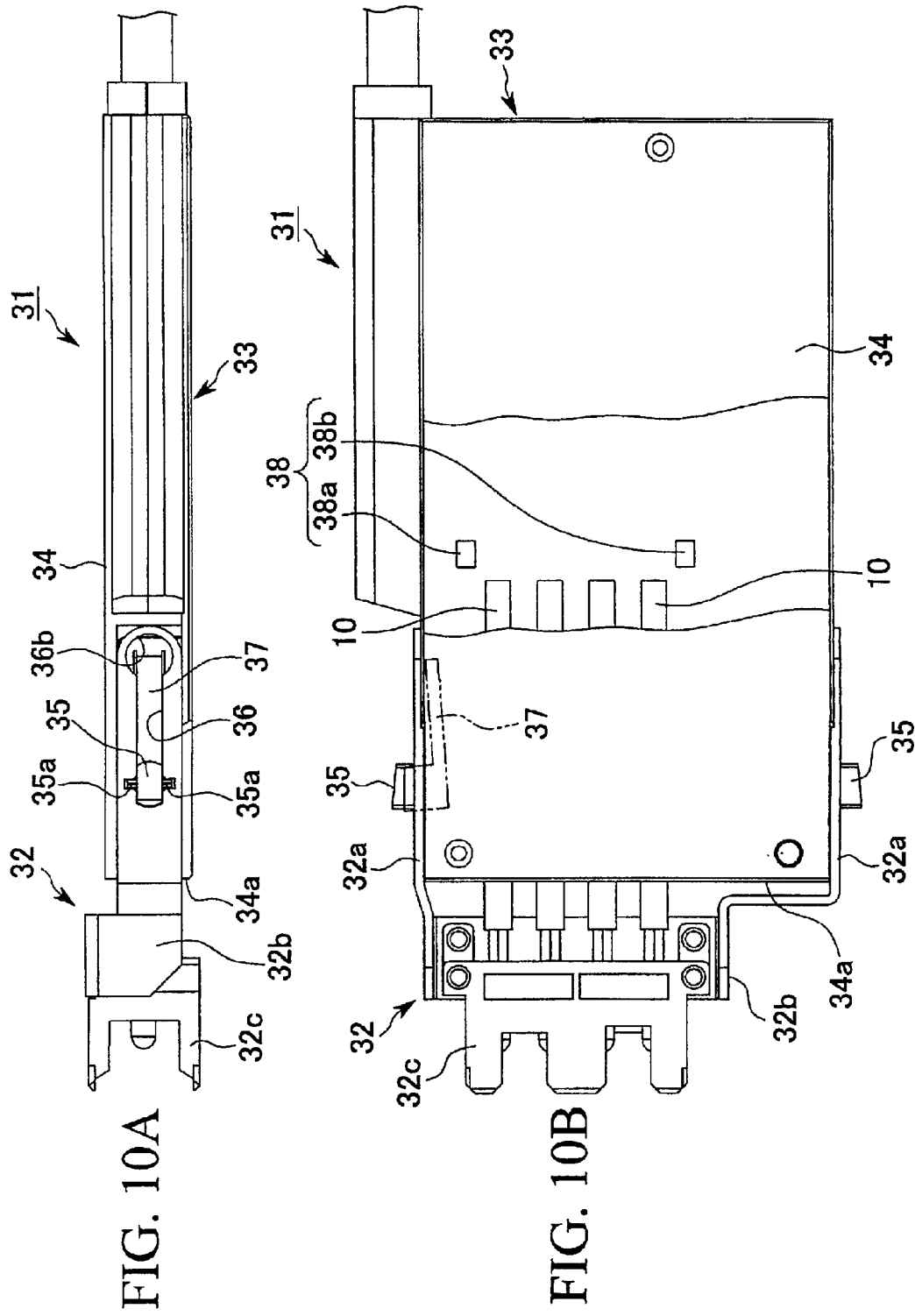
FIG. 10A is a planar view showing another example of the present invention's optical connector cleaning instrument.
FIG. 10B is a lateral view showing another example of the present invention's optical connector cleaning instrument.

FIGS. 10A and 10B shown another example of the present invention's optical connector cleaning instrument. In FIGS. 10A and 10B, the numeral 31 indicates an optical connector cleaning instrument. The main difference between this optical connector cleaning instrument 31 and the optical connector cleaning instrument 1 discussed already is that the engaging part 30 shown in FIG. 8 has been replaced by a guide member 32 that is formed to enable sliding so as not to interfere with the attachment or release of the cleaning members 11.

In other words, the guide member 32 is provided in a unitary manner to the optical connector cleaning instrument 31 shown in FIGS. 10A and 10B, on the front face 34a side of the case 34 of the head main body 33 to enable sliding thereof and so as not to become separated, or in other words, detached from the head main body 33.

This guide member 32 is provided with arms 32a, 32a which engage with buttons 35, 35 that are provided to the upper and lower faces respectively of the case 34; a holding member 32b which is provided in between these arms 32a,32a; and a guide main body 32c which is held fixed in place to the holding member 32b. A long hole 36 is formed in each arm 32a for engaging with each button 35. These long holes 36 and buttons 35 can move relative to one another. In other words, each long hole 36 is formed so that the width thereof is roughly equivalent to the width of the button 35. As a result, these long holes 36 and button 35 can move in the longitudinal direction of the long holes 36 while being mutually engaged with one another.

Figure 11:
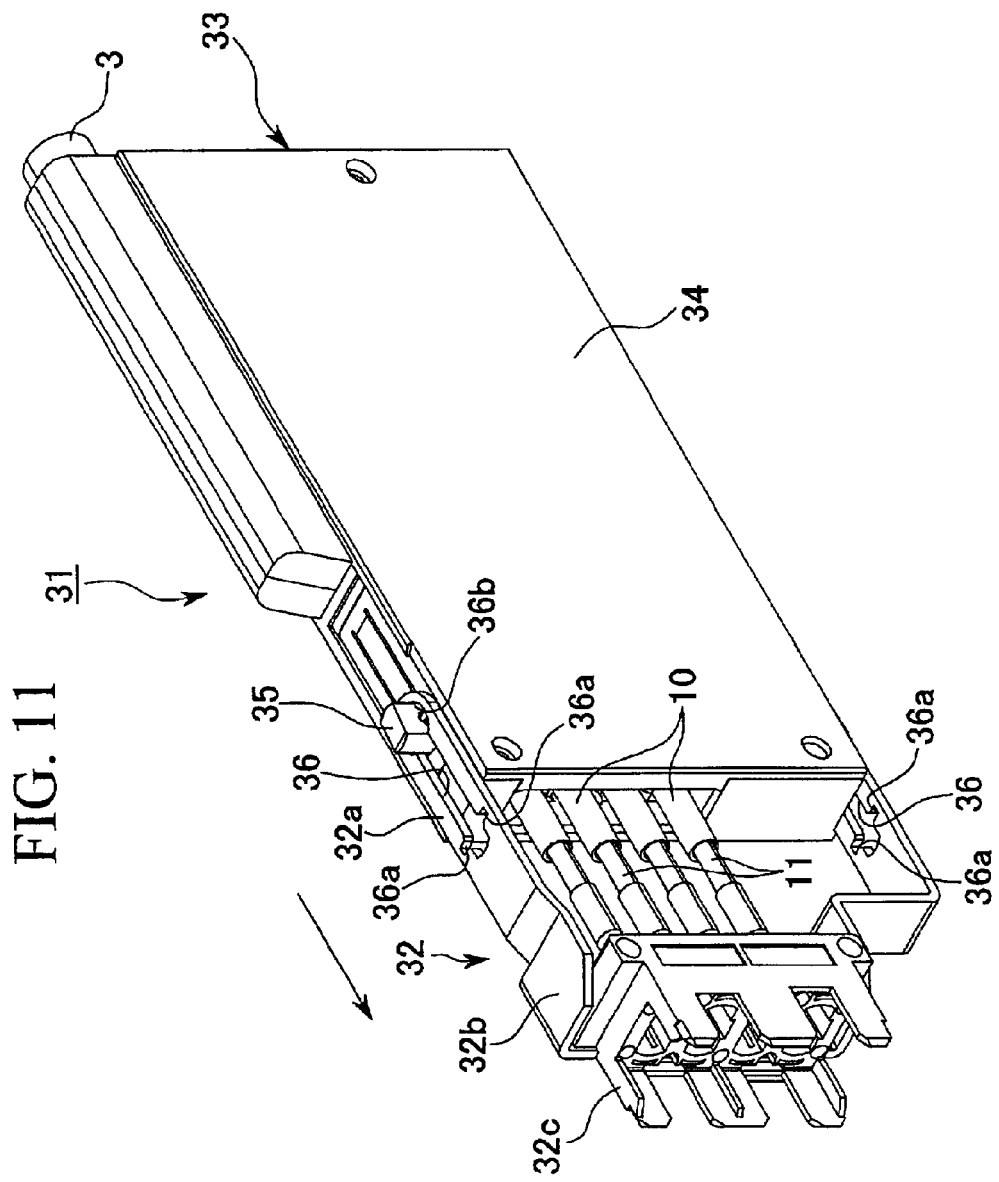
FIG. 11 is a component perspective view of the optical connector cleaning instrument shown in FIG. 10, provided for explaining the operation of the instrument.
Figure 12:
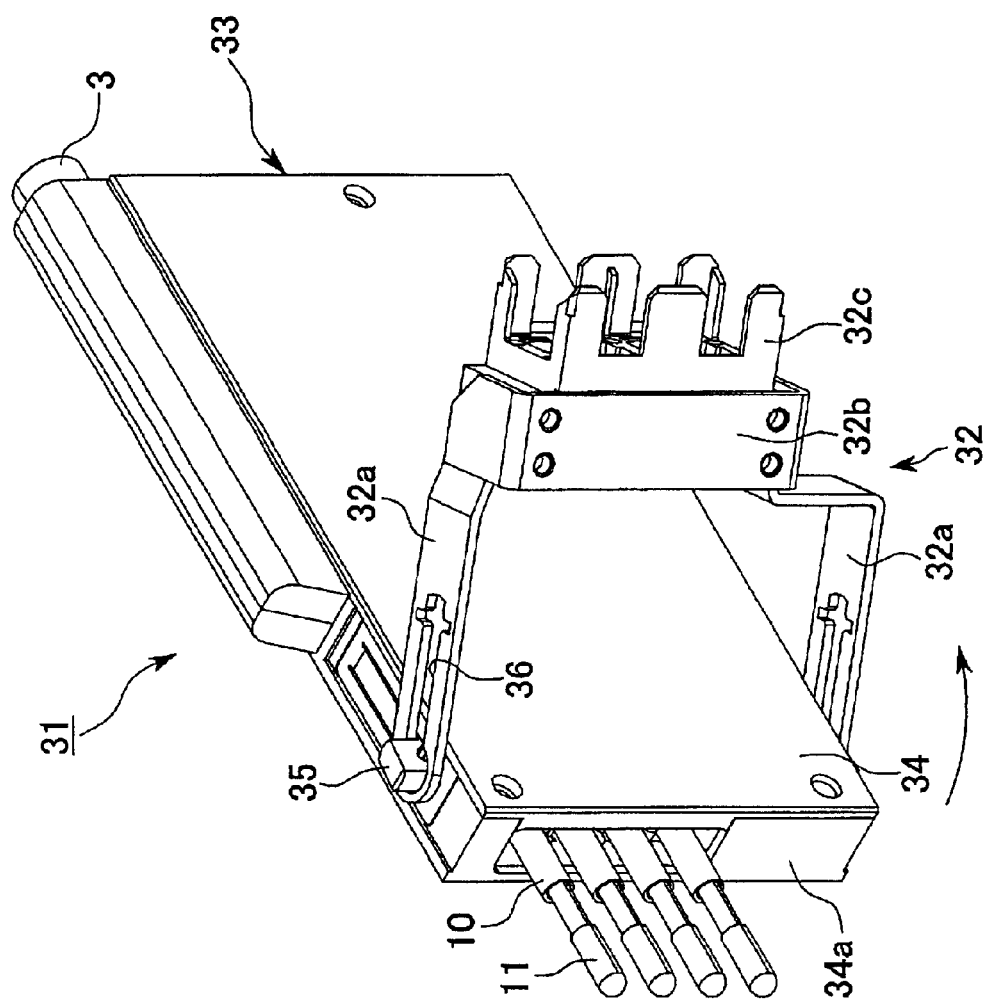
FIG. 12 is a component perspective view of the optical connector cleaning instrument shown in FIG. 10, provided for explaining the operation of the instrument.

A pair of cut-outs 36a, 36a are formed in long hole 36 so as to face guide main body 32c as shown in FIG. 11. These cut-outs 36a, 36a catch and halt stop projections 35a, 35a which are formed at the sides of button 35 as shown in FIG. 10A. In other words, the stop projections 35a, 35a of the button 35 catch and stop in the cut-outs 36a, 36a, so that movement of the arm 32a, 32a is restricted and the guide member 32 is fixed in place in the head main body 33. As a result, the guide main body 32c is fixed in place at a specific location.

A circularly shaped part 36b is formed to the side of each long hole 36 opposite cut-outs 36a, 36a. This circularly shaped part 36b is an opening having a diameter that is larger than the width of the long hole 36, and is formed to be of a size which does not interfere with stop projections 35a, 35a of each button 35.

As shown in FIG. 10A, each button 35 is formed in a unitary manner to one end of a button plate 37 which is formed by cutting out a portion of the case 34, and, as shown in FIG. 10B, projects out from the outer surface of the case 34. The button plate 37 is formed so that only the other end thereof connects with the case 34. The button 35 can be moved up or down through the elastic deformation of the button plate 37. In this design, when the button 35 is depressed, it is pushed inside the case 34 while, when the pressure is released, the button 35 protrudes outside the case 34 due to the elastic return of the button plate 37. Note that it is not absolutely essential to provide the buttons 35 to both the upper and lower surfaces of the case 34. Rather, the button 35 may be provided to just one of these surfaces, i.e, to the upper or lower surface of the case 34.

The guide main body 32c is fixed in place with a screw or the like to holding members 32b which are formed in a unitary manner with the arms 32a, 32a and connects the space therebetween. As in the case of the engaging part 30 shown in FIG. 8 for example, the guide main body 32c may be formed to the front face of the print board housing 25 shown in FIG. 5 and have the same shape as the part that engages with the BH housing 26.

The guide member 32 consisting of this design can be moved so that it does not interfere with the cleaning members 11, particularly when they are being changed.

In other words, during use, i.e., when cleaning the optical connector, the guide main body 32c is pushed into position at the head main body 33 and the stop projections 35a, 35a of the button 35 are caught in and stopped by the cut-outs 36a, 36a. As a result, the movement of the arms 32a, 32a is restricted and the guide member 32 is fixed in place at the head main body 33. As a result, the guide main body 32c is fixed in place at a specific location.

When changing the cleaning members 11 after cleaning, the buttons 35, 35 are each depressed and recede within the case 34 as shown by the two-dot chain line in FIG. 10B. By recessing the buttons 35, 35 in this way, the stop projections 35a, 35a are released from the cutouts 36a, 36a in the long hole 36, and the arms 32b, 32b can move in the longitudinal direction (i.e., the longitudinal direction of the long hole 36) with respect to the buttons 35, 35, i.e, with respect to the head main body 33.

Figure 13:
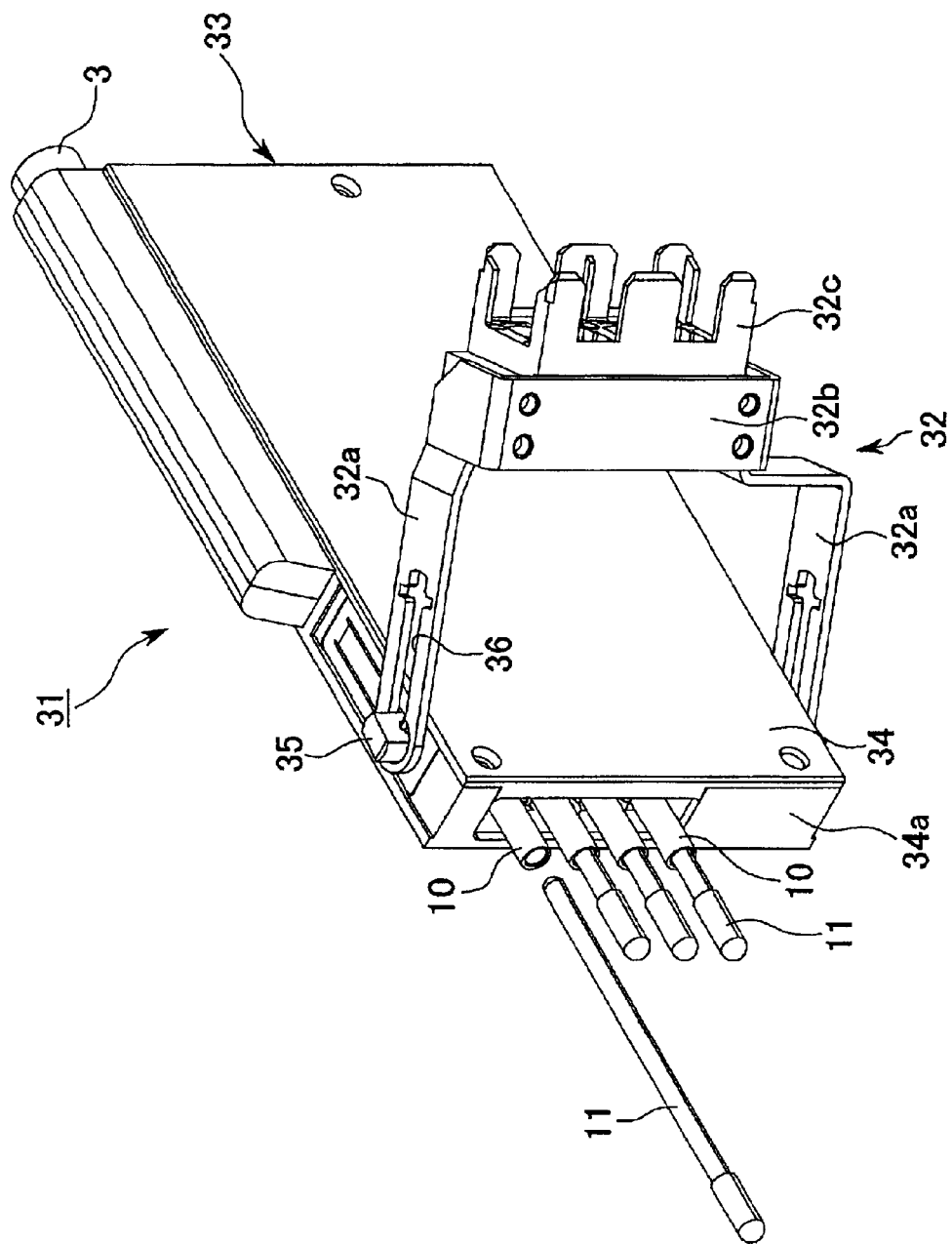
FIG. 13 is a component perspective view of the optical connector cleaning instrument shown in FIG. 10, provided for explaining the operation of the instrument.

When the buttons 35, 35 are pressed down in this way, the guide member 32 is pulled out from the front face of the head main body 33 as shown in FIG. 11 as buttons 35, 35 continue to be depressed. He circularly shaped parts 36b, 36b of the arms 32a, 32a engage in respective buttons 35, 35. In this state, or when the pushing pressure on the buttons 35, 35 has been released, the guide member 32 rotates about these buttons 35, 35 employing them as an axis, and guide main body 32c moves away from the front face 34a side of the case 34. As a result, nothing hinders the removal of the cleaning members 11 in the direction of their release, i.e., at the front face 34a side of the case 34. Thus, as shown in FIG. 13, the cleaning members 11 can be easily removed from the holding tubes 10, so that the exchange of the cleaning members 11 can be easily performed.

In addition, once the cleaning members 11 are exchanged, the operations shown in FIGS. 10A through 13 are performed in the reverse order shown in the figures to again render the device in a ready-to-use state. In other words, the guide member 32 is rotated to the position guide main body 32c at the front face 34a side of the case 34. The buttons 35, 35 are then pressed down in this state, and the guide member 32 is pushed toward the head main body 33. Once the cut-outs 36a, 36a of the long holes 36, 36 of the arms 32b, 32b reach the position of the buttons 35, 35, the pressure on the buttons 35, 35 is released and the buttons rise. As shown in FIGS. 10A and 10B, the stop projections 35a, 35a are caught in and stopped by the cut-outs 36a, 36a.

Note that the optical connector cleaning instrument 31 of the present example differs from the preceding example in that its switch is formed of a non-contact type optical switch 38 which has superior durability. This optical switch 38 consists of a light emitting element 38a and an light receiving element 38b, and is designed to be in the OFF state when light from the light emitting element 38a is being received at the light receiving element 38b, and in the ON state when the light receiving element 38b stops receiving light.

This optical switch 38 is disposed at the rear end of the holding tube 10. Specifically, at the rear end side of the aligned holding tubes 10, the light emitting elements 38a is disposed to one side of the row of the holding tubes 10 and the light receiving element 38b is disposed to the other side of the row of the holding tubes 10.

In this design, when the cleaning members 11 come into contact with and press against an optical connector, the cleaning members 11 are pressed backward under the reactive force of the optical connector. As a result, the holding tubes 10 retreat backward and the back end portion thereof cuts off the area between the light emitting element 38a and light receiving element 38b, so that the optical switch 38 is turned on and the cleaning members 11 begin the cleaning operation.

As in the case of the preceding example, it is also acceptable here for the driver 8 to be controlled by the controller 9 and for the cleaning action of the cleaning members 11 to be automatically halted once a specific period of time has elapsed since the start of the operation. However, it is also acceptable to omit provision of this type of the controller 9 and to have the optical switch 38 turn off in response to the user releasing the pressure from the cleaning members 11 on the optical connector once a specific period of time has elapsed. In other words, when the pressure on the optical connector from the cleaning members 11 is released, the holding tubes 10, which had retreated under this pressure, advance forward and return to their original position due to a momentum-applying member (not shown in the figures) previously provided. As a result, the back ends of the holding tubes 10 which were cutting off the area between the light emitting element 38a and light receiving element 38b are removed, so that the light receiving element 38b again receives light from the light emitting element 38a, placing the optical switch 38 in the OFF state as a result.

In the optical connector cleaning instrument 31 of this design, the guide member 32 is formed to enable movement with respect to the head main body 33. Therefore, when changing the leaning members 11, the guide member 32 can be moved relative to the head main body 33 and made to withdraw from the front face thereof. Thus, the guide member 32 does not interfere with the cleaning members 11, so that the attachment and release of the cleaning members 11 can be carried out easily.

The guide member 32 is provided in a unitary manner to the head main body 33 in this design. As a result, it cannot be misplaced or left off by accident, which can occur when employing a releasable guide member 32.

Note that the relationship between the contact signal outputter and the notifying means in this optical connector cleaning instrument 31 is the same as that in the above-described optical connector cleaning instrument 1, such that the notifying means employed is not particularly restricted, and the notifying means is driven based on the reception of a contact signal from the contact signal outputter or the drive order from the controller based on the contact signal, etc. A connecting terminal for electrically connecting an external device with the contact signal outputter or the controller can also be provided in the optical connector cleaning instrument 31. The ability to connect an external device that can also function as a notifying means to this connecting terminal is also the same as in the optical connector cleaning instrument 1 described above.

The optical connector cleaning instrument 31 is provided with the operating handle 3 on the front face of the head main body 33 and, although not shown in the figures, a mechanism equivalent to the vertical position holding mechanism 70 shown in FIGS. 1A through 3B. However, it is of course acceptable not to provide the operating handle 3 or the vertical position holding mechanism 70, but rather to directly attach the print board 24 to the head main body 33 as in the example shown in FIG. 9. It is also acceptable to attach the head main body 33 to a board like the print board 24, and to then attach the vertical position holding mechanism 70 to this board.

The guide main body 32c in the guide member 32 is not limited to use in the MPO type optical connector; rather, it can be employed in various types of optical connectors. In addition, the specific shape of the guide main body 32c is not limited to that shown in the figures (i.e., a claw projecting out from the front end of the guide main body 32c). Rather, various modifications are of course possible.

The present invention's optical connector cleaning instrument was designed to employ cotton swabs as the cleaning members. Urethane foam swabs manufactured by The Texwipe Company, for example, are optimally employed for these cotton swabs. However, the present invention's cleaning members are not limited to a design in which a fabric member made out of cotton, etc. is attached to the tip of the swab; rather, various other embodiments can be employed. Any material may be employed, provided it is one for gentle wiping that will not damage the end surface of the optical connector, such as, for example, a cloth or paper soaked with a cleaning solution, or a foam resin in sponge form. In addition, this material may be employed to form the entire cleaning member, and not just the end of the swab. It is also acceptable to run a tape-type cleaning member using a driver consisting of a roller or the like, to clean the end of the optical connector. Further, when using a cotton swab, a material which does not readily shed fibers, such as polyurethane or polyester, may be used for the fabric member comprising the cotton portion.

The optical connector to be cleaned in the present invention is not limited to the MPO type optical connector. Various optical connectors may be used. In addition, the present invention may be employed for one optical connector, or for many.

In addition, the engaging part 30 and at least the guide main body 32c of the guide member 32 are provided in a releasable manner to the front faces 5a, 34a of the head main body 4. As a result, by changing the engaging part 30 and guide main body 32c in the case where the array pitch of the connector holes (i.e., the pitch of the holes arrayed vertically in the figures) has not changed, the optical connector cleaning instruments 1, 31 can be engaged in the BH housing 26 in response to changes in the shape of the BH housing 26 accompanying an increase or decrease in the number of connectors.

Note that in view of the property of engaging with the BH housing 26, the shapes of the front ends of the engaging part 30 or the guide main body 32c have a design resembling the PH housing 25 described above, however do not have the engagement releasing claw that is provided to the PH housing 25, for releasing the engagement between the inner housing and the outer housing of the BH housing 26. Accordingly, unlike the case where the PH housing 25 is engaged with the BH housing 26, when the engaging part 30 or the guide main body 32c are engaged with the BH housing 26, the engagement between the inner housing and the outer housing of the BH housing 26 is supported. As a result, when pulling the engaging part 30 or the guide main body 32c out from the BH housing 26, the inner housing of the BH housing 26 does not come free from the outer housing.

What is claimed is:

1. An optical connector cleaning instrument for cleaning the front end of an optical connector, comprising:
    a cleaning member for coming into contact with the optical connector front end and cleaning said optical connector front end, said cleaning member moving rearward in response to pressure from contacting said optical connector front end;
    a driver for driving the cleaning operation of said cleaning member; and
    a switch responsive to rearward movement of said cleaning member for initiating the driving operation of said driver.

2. An optical connector cleaning instrument according to claim 1 further comprising:
    a controller for controlling the driving action of said driver, said controller controlling said driver so that said driver terminates its driving action once a specific period of time has elapsed since its driving action was initiated via said switch.

3. An optical connector cleaning instrument according to claim 1, further comprising:
    a head main body;
    said cleaning member is being connected in a releasable manner to said head main body; and
    a guide member on said head main body for guiding said cleaning member to and positioning said cleaning member at said optical connector front end, said guide member being formed to enable movement with respect to said head main body so as to permit attachment and release of said cleaning member without interference.

4. An optical connector cleaning instrument according to claim 3, wherein said guide member is provided in a unitary manner without separating from said head main body.

5. An optical connector cleaning instrument according to claim 1 further comprising:
    a contact signal outputter that outputs a signal when the front end of said cleaning member comes into contact with said optical connector front end.

6. An optical connector cleaning instrument according to claim 5 further comprising means for notifying the user when the front end of said cleaning member come into contact with the optical connector front end, based on the signal output from said contact signal outputter.

7. An optical connector cleaning instrument according to claim 1, wherein a plurality of said cleaning members are provided in parallel, and said cleaning members begin the cleaning operation when the front end of at least one of said plurality of cleaning members comes into contact with the connector front end.

8. An optical connector cleaning instrument according to claim 1, further comprising:
    a head main body; and
    a guide member for guiding said cleaning member to and positioning said cleaning member at the optical connector front end provided in a releasable manner to said head main body.

9. A method for cleaning an optical connector front end using an optical connector cleaning instrument, comprising the steps of:
    providing an optical connector cleaning instrument with a cleaning member for coming into contact with the optical connector front end; and cleaning the front end of said optical connector;
    moving said cleaning member rearward in response to pressure from the optical connector front end;
    providing a driver for driving the cleaning action of said cleaning member; and
    activating a switch for initiating the driving operation of said driver in response to a rearward movement of said cleaning member; when the front end of said cleaning member comes into contact with the optical connector front end and moves rearward in response to the pressure from the optical connector front end.

10. An optical connector cleaning member as claimed in claim 1 wherein said cleaning member is moved in a direction toward the optical connector front end to activate said switch and said driver rotates said cleaning member.

11. An optical connector cleaning member as claimed in claim 10 to be used with an optical connector within a casing and further comprising:
    a body on which said cleaning member is mounted;
    resilient means for positioning said body in a direction generally transverse to the movement of said cleaning member for coming into contact with the optical connector.

12. An optical connector cleaning member as claimed in claim 1 further comprising a body on which said cleaning member is mounted and a handle connected to said body to move said cleaning member toward and away from the optical connector.

13. An optical connector cleaning member as claimed in claim 12 to be used with an optical connector within a casing further comprising resilient means for positioning said body in a direction generally transverse to the movement of the cleaning member for coming into contact with the optical connector.

* * * * *